US010188234B1

United States Patent
Sullivan

(10) Patent No.: US 10,188,234 B1
(45) Date of Patent: Jan. 29, 2019

(54) CHRISTMAS TREE MOISTURE SENSOR

(71) Applicant: Belac Products, LLC, Lewisville, NC (US)

(72) Inventor: Terrance Sullivan, Clemmons, NC (US)

(73) Assignee: Belac Products, LLC, Lewisville, NC (US)

( * ) Notice: Subject to any disclaimer, the term of this patent is extended or adjusted under 35 U.S.C. 154(b) by 37 days.

(21) Appl. No.: 15/651,641

(22) Filed: Jul. 17, 2017

Related U.S. Application Data

(60) Provisional application No. 62/363,650, filed on Jul. 18, 2016.

(51) Int. Cl.
*A47G 33/08* (2006.01)
*G08B 21/20* (2006.01)
*G08B 21/18* (2006.01)
*A47G 33/12* (2006.01)

(52) U.S. Cl.
CPC ....... *A47G 33/0881* (2013.01); *G08B 21/182* (2013.01); *G08B 21/20* (2013.01); *A47G 2033/1293* (2013.01)

(58) Field of Classification Search
CPC ............ A47G 33/12; A47G 2033/1286; A47G 2033/129; A47G 33/0881; A47G 2033/1293; G08B 21/182; G08B 21/20
See application file for complete search history.

(56) References Cited

U.S. PATENT DOCUMENTS

| | | | |
|---|---|---|---|
| 4,796,017 A * | 1/1989 | Merenda | A47G 33/0881 324/694 |
| 5,428,348 A * | 6/1995 | Gault | A47G 33/12 324/694 |
| 5,493,277 A * | 2/1996 | Pierce | A47G 33/0881 340/618 |
| 5,625,345 A | 4/1997 | Stark et al. | 340/628 |
| 5,799,437 A * | 9/1998 | Evans | A01G 27/005 340/618 |
| 6,018,247 A * | 1/2000 | Kelly | G01D 5/202 324/643 |
| 6,082,043 A * | 7/2000 | Andrews | A01G 27/006 340/618 |
| 6,088,960 A * | 7/2000 | Hartzog | A47G 33/0881 340/620 |
| 6,401,742 B1 * | 6/2002 | Cramer | A01G 25/167 137/78.3 |
| 9,265,374 B2 * | 2/2016 | Rasschaert | G08B 21/00 |
| 2005/0279287 A1 * | 12/2005 | Kroeker | A01K 7/00 119/72 |
| 2007/0079653 A1 * | 4/2007 | Zuleta | G01F 23/243 73/304 R |

(Continued)

*Primary Examiner* — An T Nguyen
(74) *Attorney, Agent, or Firm* — MacCord Mason PLLC

(57) ABSTRACT

A moisture sensor providing a visual and audio alert when a tree needs to be watered. The moisture sensor may be mounted onto Christmas trees to detect when water levels are low in the tree stand. The moisture sensor comprises a housing and a probe attached to the housing. The housing may be a Christmas-themed character. The moisture sensor includes a PC board within the housing for determining water levels in the tree stand and uses a LED indicator and speaker to indicate when water levels are below a threshold.

9 Claims, 15 Drawing Sheets

(56) References Cited

U.S. PATENT DOCUMENTS

2007/0103324 A1* 5/2007 Kosuge .................... E03F 7/00
340/618
2011/0214345 A1* 9/2011 Rasschaert ............. A47G 33/12
47/40.5

* cited by examiner

CHRISTMAS TREE MOISTURE SENSOR

FIELD OF THE TECHNOLOGY

The present disclosure relates generally to moisture sensors, and more particularly, to a moisture sensor that signals a visual and audio alert when a tree needs to be watered.

BACKGROUND

Many families celebrate the Christmas season by placing one or more Christmas trees throughout the house. Either natural or artificial trees may be used, and are typically decorated with ornaments and light displays. The presence of light displays may present a fire hazard if placed on natural trees that are dehydrated. Proper maintenance and watering of natural trees is necessary to eliminate the risk of a fire. Yet, most families erect natural trees without providing the trees with a sufficient supply of water for it to remain hydrated. Thus there remains a need to provide a system for alerting users when the water levels for a natural tree are low, while at the same time, encouraging users to consider regularly watering tree as part of a holiday tradition.

SUMMARY

In accordance with the present disclosure, a moisture sensor is provided that signals a visual and audio alert when a tree needs to be watered. This disclosure provides a system and method for ensuring that a tree is consistently watered for safety, while providing an entertaining means to indicate that water levels are low. By providing a visual and audio alert for a user, it is not necessary for a user to manually gauge the water levels on a tree stand. Moreover, the audio alert and decorative housing of the moisture sensor may provide an opportunity for another holiday tradition of watering the tree whenever a chime sounds.

One embodiment of the present disclosure includes a moisture sensor comprising a housing to mount onto a tree stem, a probe attached to the housing and adapted to detect water levels in a tree stand, a PC board within the housing for determining water levels in the tree stand, a LED indicator that provides a visual signal when water levels are below a threshold in the tree stand, and a speaker that provides an audio signal when water levels are below the threshold in the tree stand. The LED indicator signals the visual alert and the speaker signals the audio alert when the probe detects that the water level is below a threshold. The housing may include a strap for wrapping around the tree stem, and may also include a vent to improve emission of the audio alert.

In one example, the moisture sensor is powered by a battery. For instance, the PC board is configured to check the level of the battery and the water level after an interval. The interval may be of any duration, such as about one hour. Further, the LED indicator may indicate a level of the battery. The housing may also include a power switch to reduce power consumption.

In certain examples, the probe detects the conductivity of water to determine the water level. For instance, the probe may comprise a copper wire connected at one end to the PC board and an opposing end capped by a conductive shield. The moisture sensor may further include a conductive rod with insulators at each opposing end wherein the probe is separated by one insulator at a first end of the conductive rod and the other end of the conductive rod is inserted into the housing.

In some examples, the housing is shaped like a character. For instance, the character may be Christmas-themed or a mascot. Similarly the moisture sensor may include a chime as an audio alert. The chime may be appropriately selected based on the housing. For example, the housing may resemble a reindeer and the audio alert may play "Rudolph the Red-Nosed Reindeer" or other Christmas-related chime.

The present disclosures may also be considered a method for alerting a user that a tree needs to be watered. The method may include the steps of inserting a probe having a housing into a water container and attaching the housing to a tree stem, measuring water conductivity from the probe, emitting a visual signal that the water container contains insufficient water, and emitting an audio signal that the water contains insufficient water. The method may also include the step of measuring the water conductivity from the probe at regular intervals. By way of example, the regular interval may be about one hour.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
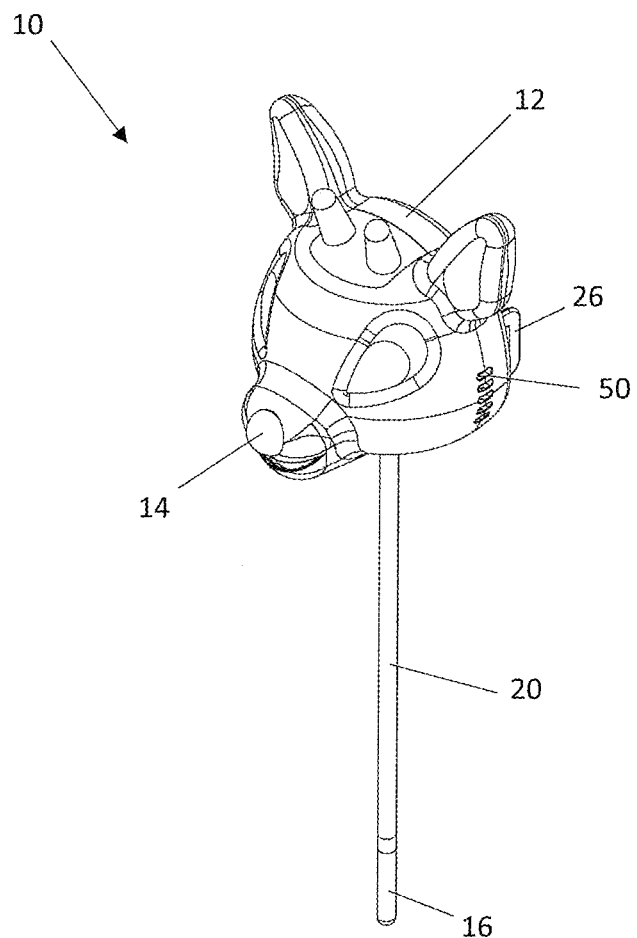
FIG. 1 is an overhead perspective view of one example of a Christmas tree moisture light sensor according to the present disclosure.
Figure 2:
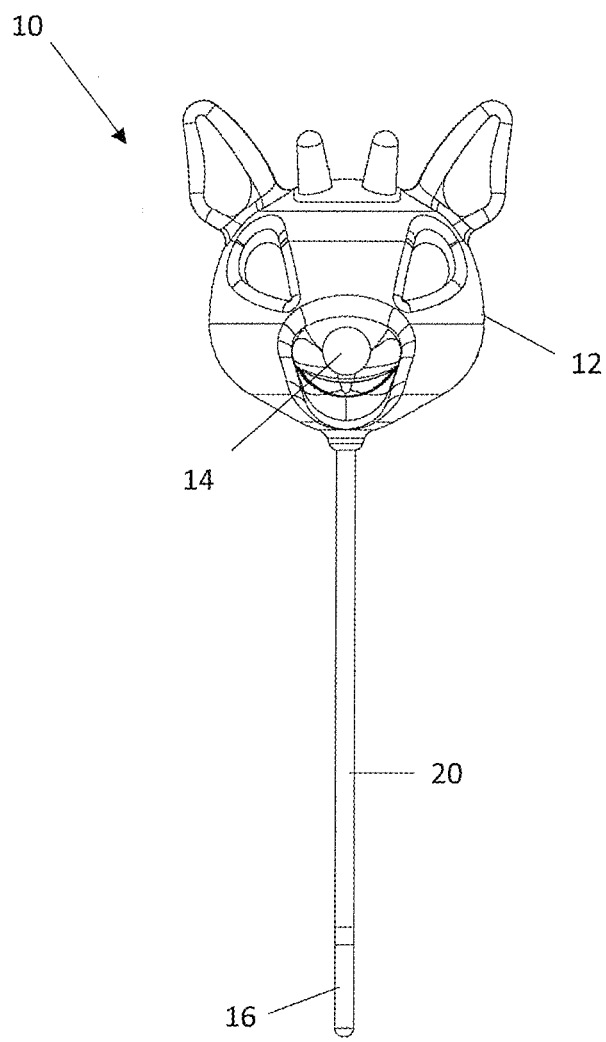
FIG. 2 is a front elevational view of the example shown in FIG. 1.
Figure 3:
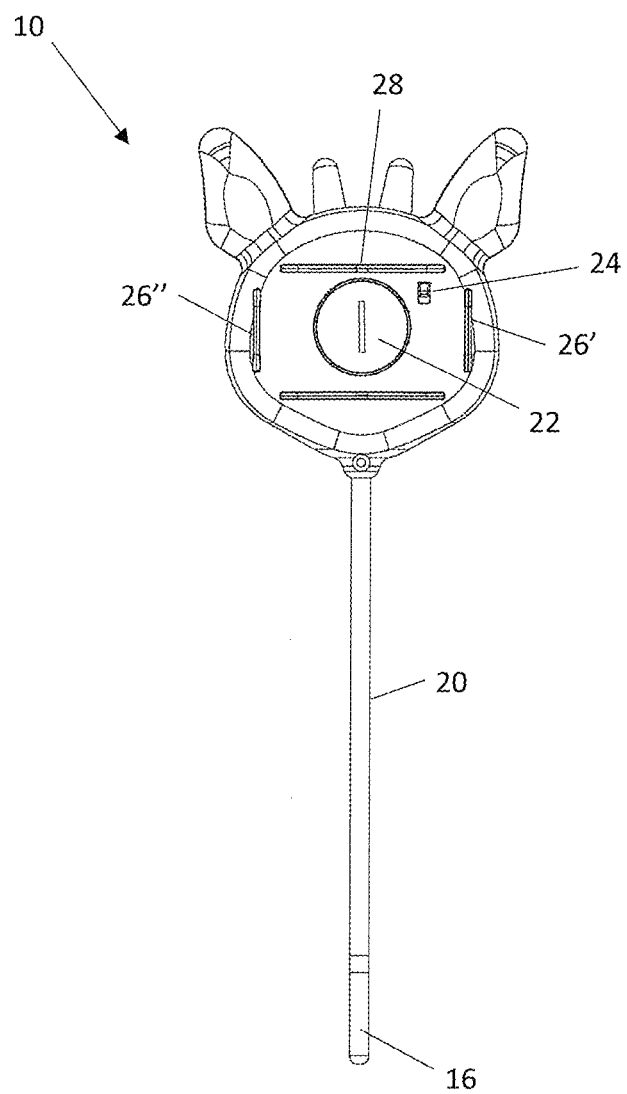
FIG. 3 is a back elevational view of the example shown in FIG. 1.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing embodiments of the disclosure and are not intended to limit the disclosure or any invention thereto. As best seen in FIGS. 1 through 6, a moisture sensor, generally designated 10, comprises a housing 12 having an LED indicator 14 and a probe 16 adapted to detect water levels in a tree stand. Probe 16 is connected by a rod 20 extending downward and adapted to be inserted into a water pot of a tree stand.

Moisture sensor 10 may be battery-powered to reduce clutter around a Christmas tree as well as potential dangers associated with a power cord near the water pot. For example, the battery may be a lithium battery. The battery may be accessible from a battery door 22 so that housing 12 does not need to be disassembled to replace the battery. A power switch 24 may be included with the moisture sensor 10 to reduce battery consumption. As shown in the embodiment depicted in FIG. 3, the power switch 24 and battery door 22 may be accessible in the rear.

Figure 4:
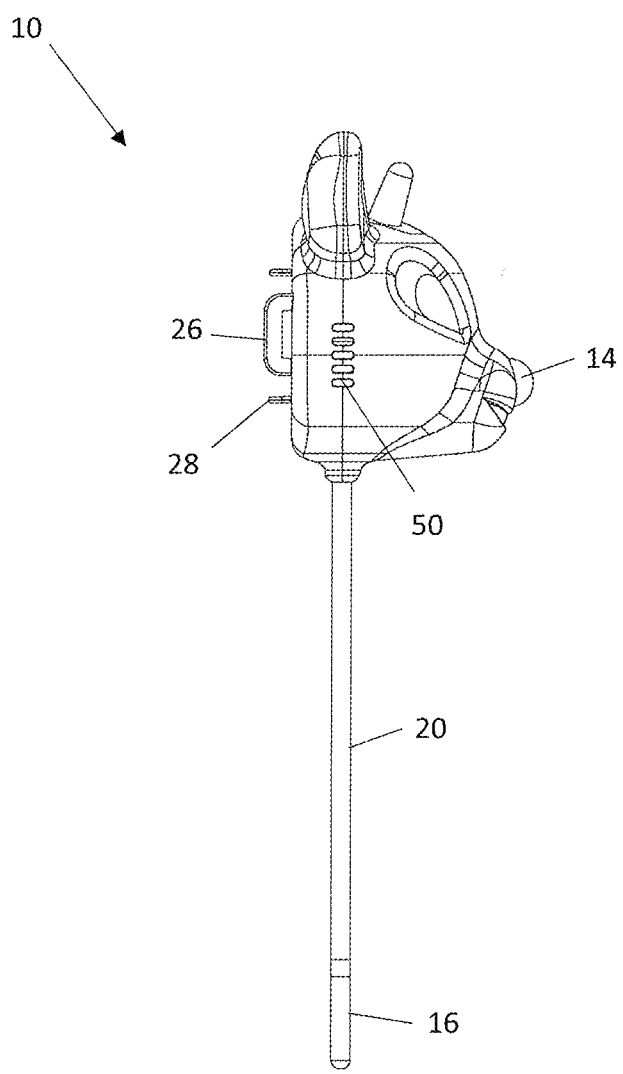
FIG. 4 is a side elevational view of the example shown in FIG. 1 (the opposing side being a mirror image)
Figure 5:
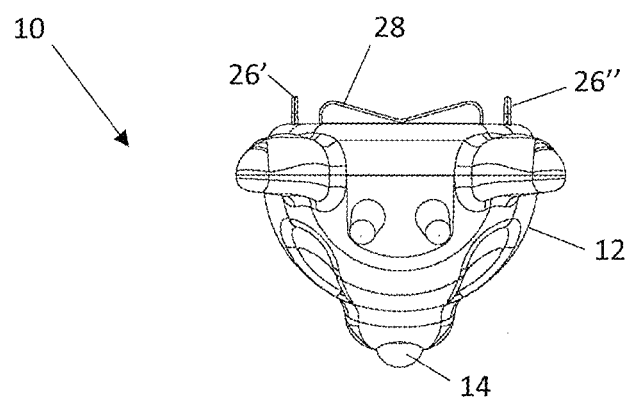
FIG. 5 is a top view of the example shown in FIG. 1.
Figure 6:
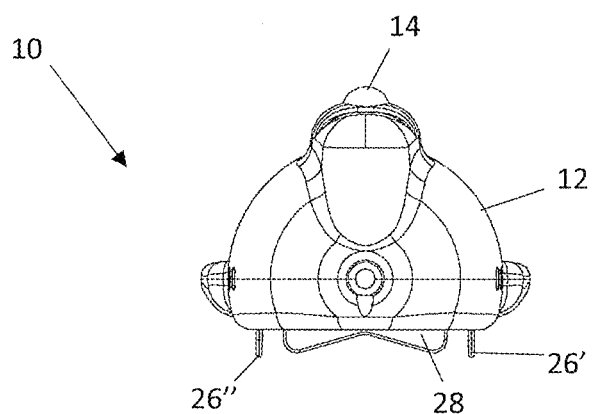
FIG. 6 is a bottom view of the example shown in FIG. 1.

As seen in FIG. 4, housing 12 may include slots 26 adapted to receive straps for mounting the housing onto a tree. For instance, as best seen in FIGS. 5 and 6, one end of the strap inserted into a first slot 26', wherein the strap is wrapped around the tree and then secured by a second slot 26" on housing 12. In other embodiments, housing 12 may use alternative types of mounts for mounting housing 12 onto a tree. For example, housing 12 may include a hole adapted to receive a fastener, wherein housing 12 is mounted onto the tree via the fastener. Alternatively, a clamp may be used to mount housing 12 onto the tree. Yet in other embodiments, the moisture sensor 10 may be mounted at rod 20 instead of housing 12. Housing 12 may also include winged protrusions 28 to secure housing 12 more flushly to a tree. Winged protrusions 28 may also aid in accessing power switch 24 if it is located in the rear, as well as prevent damage to the rear door of the housing from the abrasive surface of the tree when mounted.

Figure 7:
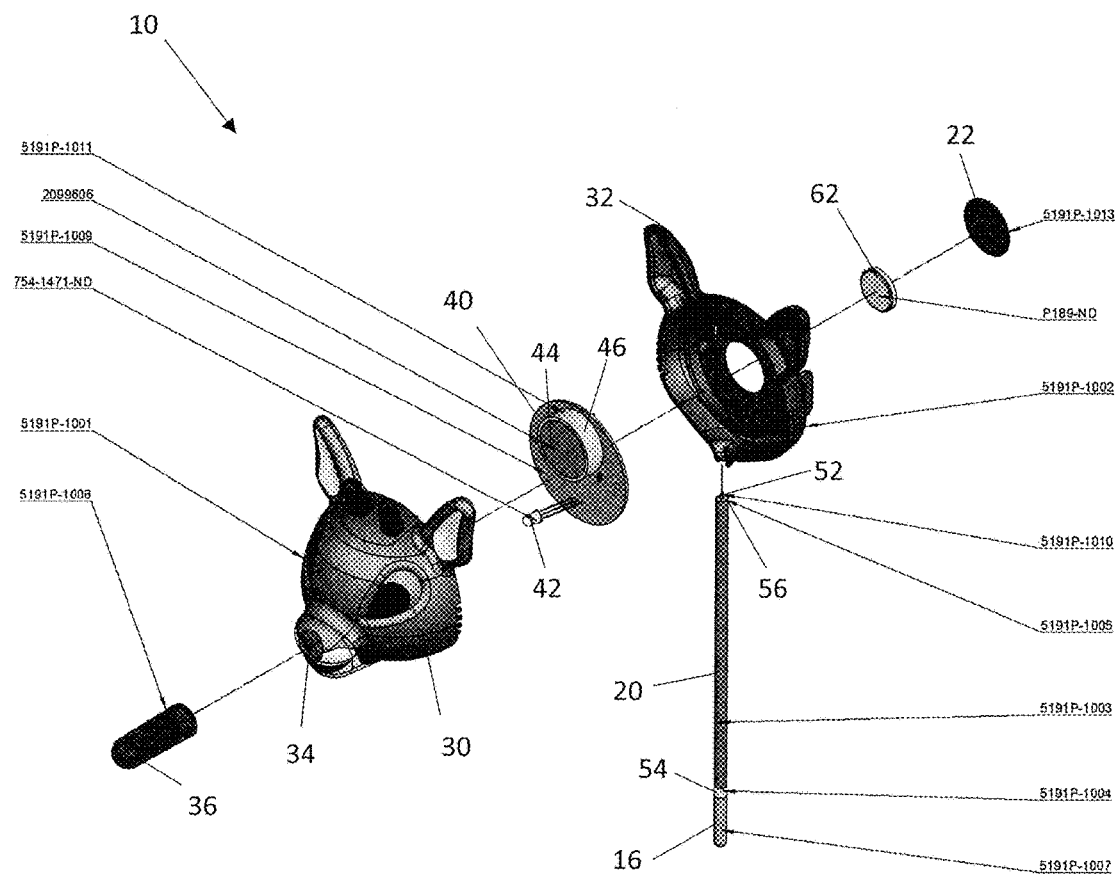
FIG. 7 is a front perspective exploded view of a Christmas tree moisture light sensor.

Turning to FIG. 7, a disassembled view is shown to illustrate various components of moisture sensor 10. Housing 12 may comprise a first piece 30 and a second piece 32 assembled together. For instance, in the example shown, first piece 30 comprises the front face of housing 12 and second piece 32 comprises the back face of housing 12. A PC board 40 is nested within housing 12, and further includes a LED bulb 42 and speaker 44 with speaker ring 46. When first piece 30 and second piece 32 are assembled, ventilation 50 forms along the sides of housing 12 to enable any potential heat dissipation as well as facilitate sound emission from speaker 44.

As seen in this particular example, both LED bulb 42 and speaker 44 are placed on a front-facing side of PC board 40, so that LED bulb 42 may emit through the front face of housing 12. LED cover 36 is inserted through cavity 34 and over LED bulb 42 to form LED indicator 14. LED cover 36 may be comprised of any color. In the example shown, LED cover 36 comprises a red acrylic plastic to mimic the red nose of the character Rudolph. Similarly, LED bulb 42 may emit one or more different colors depending on the ornamental effects and functional signals desired.

In some embodiments, speaker 44 may be used to signal various alerts such as low battery life or water levels. Speaker 44 may also be used to play various tunes, such as a start-up chime. In one example, housing 12 may resemble a reindeer and speaker 44 plays the tune Rudolph when initially powered-on. The tune may also play to signal a low water level alert. In another example, housing 12 may resemble Santa Claus and speaker 44 plays a Christmas tune such as "Santa Claus is Coming to Town." In yet another example, housing 12 may resemble a sports team mascot and speaker 44 plays the fight song for the respective sports team.

A conductive wire 52 for sensing water conductivity runs through probe 16 and rod 20 and connects to PC board 40. Probe 16 and rod 20 are separated by a bottom insulator 54, and rod 20 further includes a top insulator 56 at an opposing end. In one example, conductive wire 52 is a copper wire wherein the bottom probe 16 comprises stainless steel and rod 20 comprises copper. Bottom insulator 54 and top insulator 56 may comprise a plastic such as acetal delrin.

Figure 8:
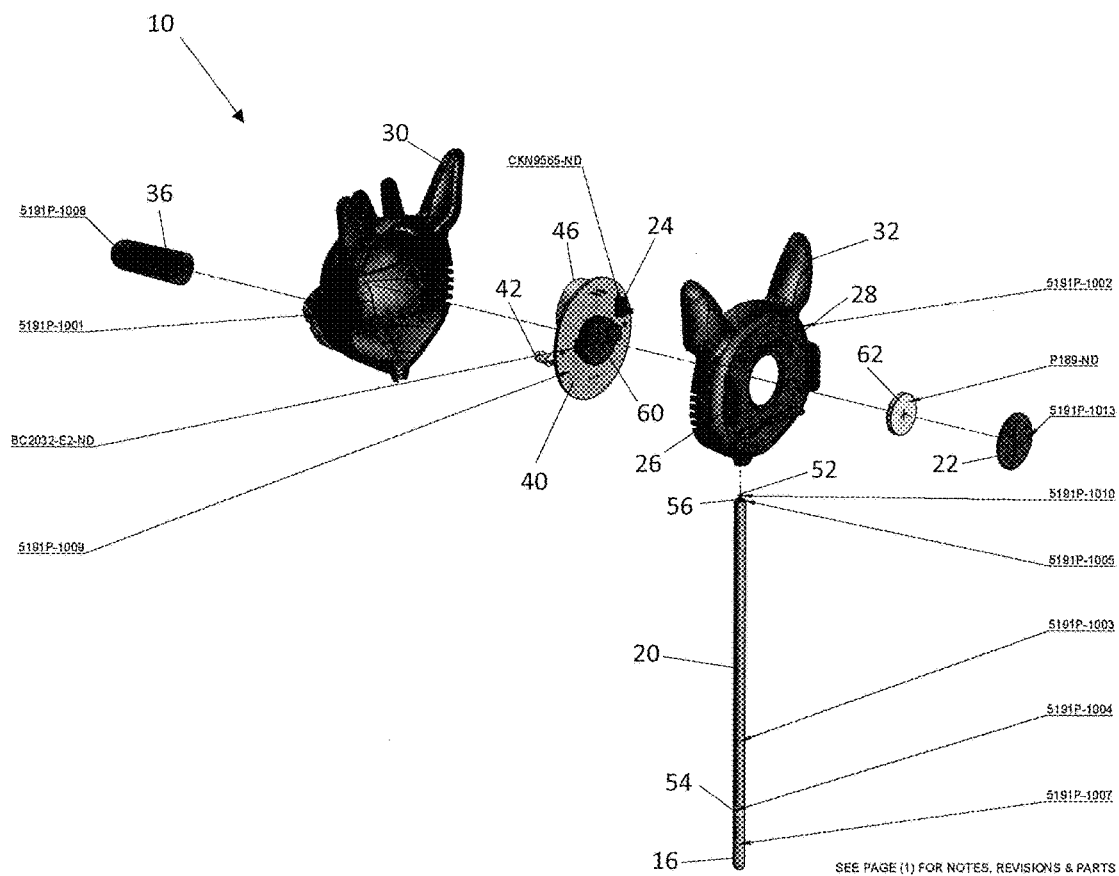
FIG. 8 is a rear perspective exploded view of the Christmas tree moisture light sensor of FIG. 7.

FIG. 8 shows a rear exploded view of the moisture sensor 10 shown in FIG. 7. PC board 40 may further include a battery holder 60 adapted for receiving battery 62 as a power supply. Battery door 22 may be inserted into second piece 32 and fastened in to flushly abut the back of second piece 32. Power switch 24 may also be included to further reduce battery consumption when moisture sensor 10 is not in use.

Figure 9:
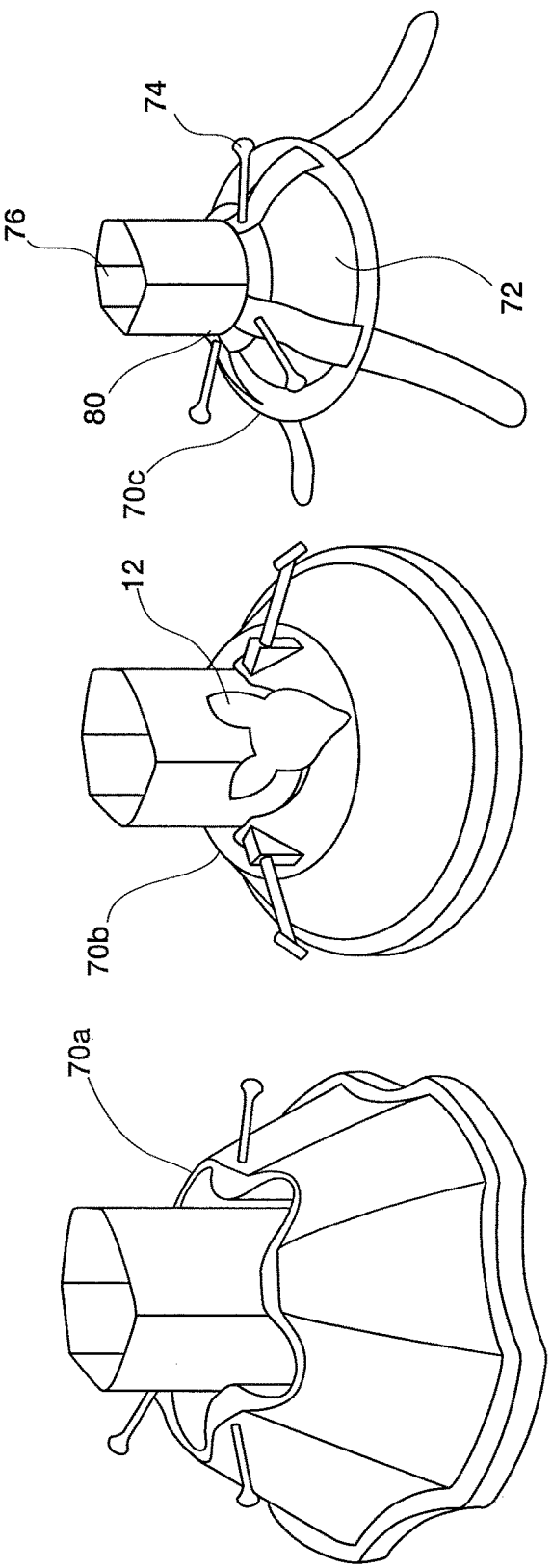
FIG. 9 is a front perspective view of a plurality of Christmas tree stands compatible with Christmas tree moisture light sensors disclosed herein.

The moisture sensors provided by the present disclosure may be used for numerous types of tree stand. FIG. 9 provides a couple of examples of tree stands that are suitable for moisture sensor 10. Tree stands 70a, 70b, and 70c each include a container 72 for holding water and tree stem 76, with pins 74 to secure tree stem 76 in place. Moisture sensor 10 may be secured around tree stem 76 using a strap 80.

Figure 10:
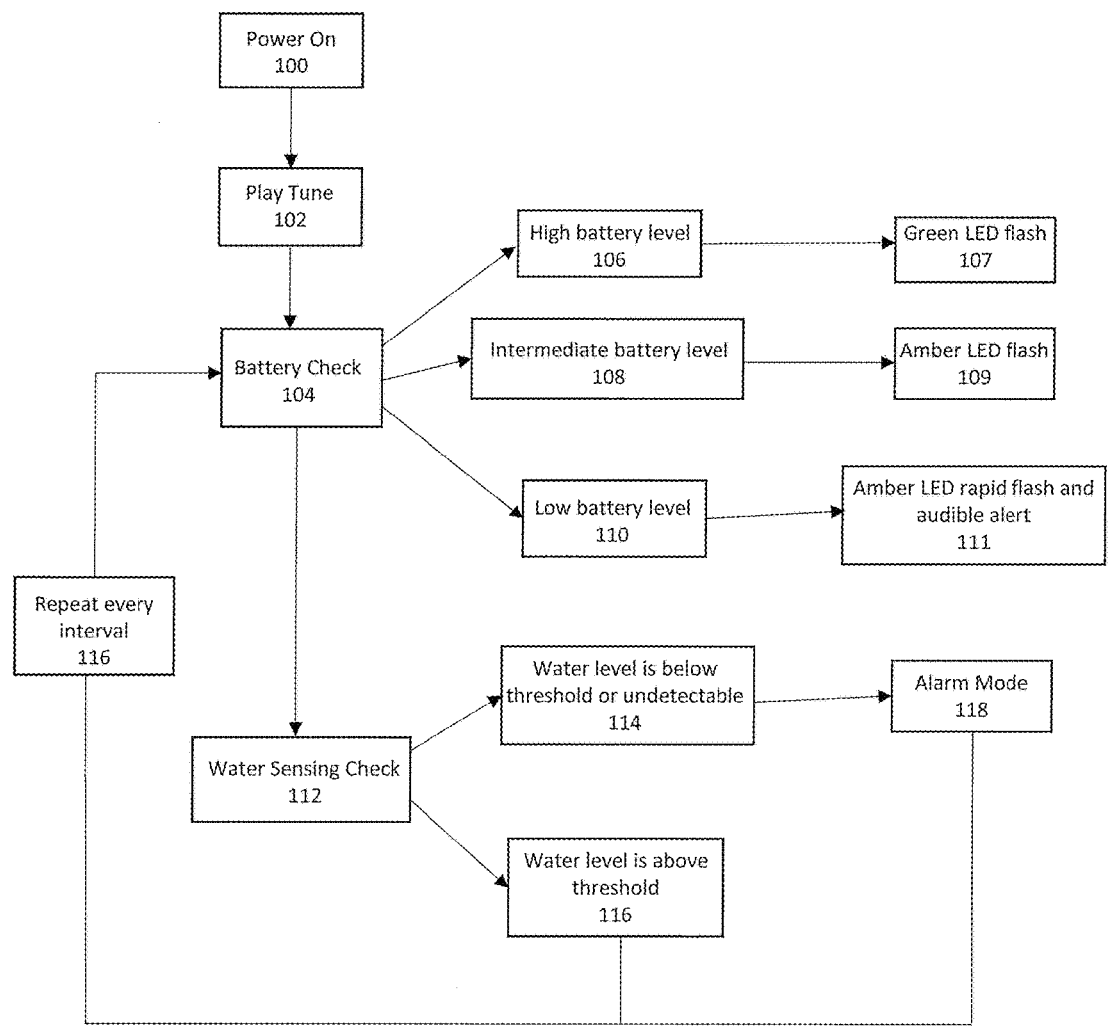
FIG. 10 is a flow chart illustrating an algorithm for use with a Christmas tree moisture light sensor.

FIG. 10 illustrates one algorithm that may be implemented for moisture sensor 10. In the example shown, a user may plug in, insert a battery, or flip a switch to supply power 100. When the moisture sensor is powered on, a start-up tune may be played 102. If a battery is used to power the moisture sensor, then the PC board may check the battery level 104.

In one embodiment, if the battery level is high 106, then PC board may signal the LED bulb to provide a green flash 107. If the battery level is intermediate 108, then PC board may signal the LED bulb to provide an amber-colored flash 109. If the battery level is low 110, then PC board may signal the LED bulb to rapidly flash an amber-colored light 111. PC board may also produce an audible alert through the speaker. In other embodiments, other colors and audible alerts may be used at various battery levels. For example, a second LED bulb may be provided that continuously emits a color depending on the battery level.

The ranges of battery level may also vary between examples. For instance, a "high" range may be considered between about 90% to about 100%, an "intermediate" range may be considered between about 60% to about 80%, and a low range may be considered from about 60% and lower. Some PC boards may employ fewer or more than three levels to classify battery life.

PC board also performs a water sensing check once moisture sensor is powered on 112. The water sensing check 112 may be performed before, after, or simultaneously with battery check 104. While the moisture sensor is performing the battery check and water sensing check, the LED bulb may flash to signal to a user that the moisture sensor is operational and performing the checks.

During water sensing check 112, the probe is used to check whether the water level is at a certain threshold. If the water level is below the threshold or undetectable 114, then the moisture sensor enters an alarm mode. In one example, the alarm mode may comprise of flashing the LED bulb continuously along with an audio alert. For instance, the audio alert may be a short chime such as "Rudolph the Red-Nosed Reindeer." The LED bulb may continuously flash for the duration of the audio alert. If the water level is not filled to the threshold after the alert, the moisture sensor may re-enter the alarm mode after a defined interval. For example, the interval may be one hour. The alarm mode may be looped at every interval until the water level is restored 118. Similarly, if the water level is at or above the defined threshold 116, then the moisture sensor resumes normal operation until the next interval. At the next interval, the moisture sensor may check the water and battery levels again 118.

Figure 11:
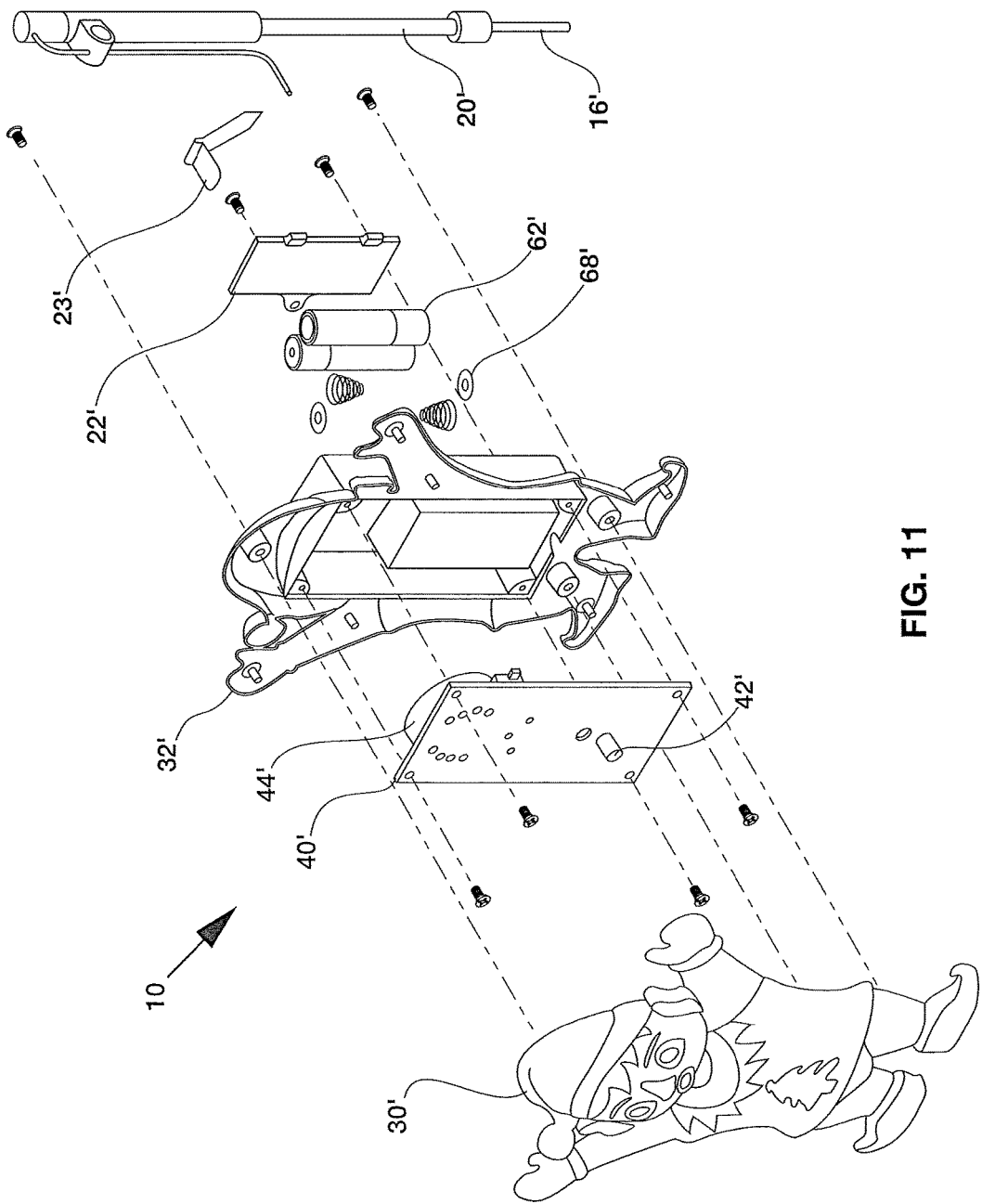
FIG. 11 is a front perspective exploded view of a Christmas tree moisture light sensor.

FIG. 11 illustrates another example of a moisture sensor 10', comprising a housing having an LED indicator and a probe 16' adapted to detect water levels in a tree stand. Probe 16' is connected by a rod 20' extending downward and adapted to be inserted into a water pot of a tree stand. The disassembled view illustrates various components of moisture sensor 10'. The housing shown comprises a first piece 30' and a second piece 32' assembled together. In the example shown, first piece 30' comprises the front face of the housing and second piece 32' comprises the back face of the housing. A PC board 40' is nested within housing 12, and further includes a LED bulb 42' and speaker 44'.

As seen in this particular example, LED bulb 42' is placed on a front side while speaker 44' is placed on a back-facing side of PC board 40', so that LED bulb 42' may emit through the front face of housing 12. LED bulb 42 may emit one or more different colors depending on the ornamental effects and functional signals desired. Batteries 62' are installed onto battery coils 68'. A battery door 22' and battery insulating tab 23' may further be included.

Figure 13:
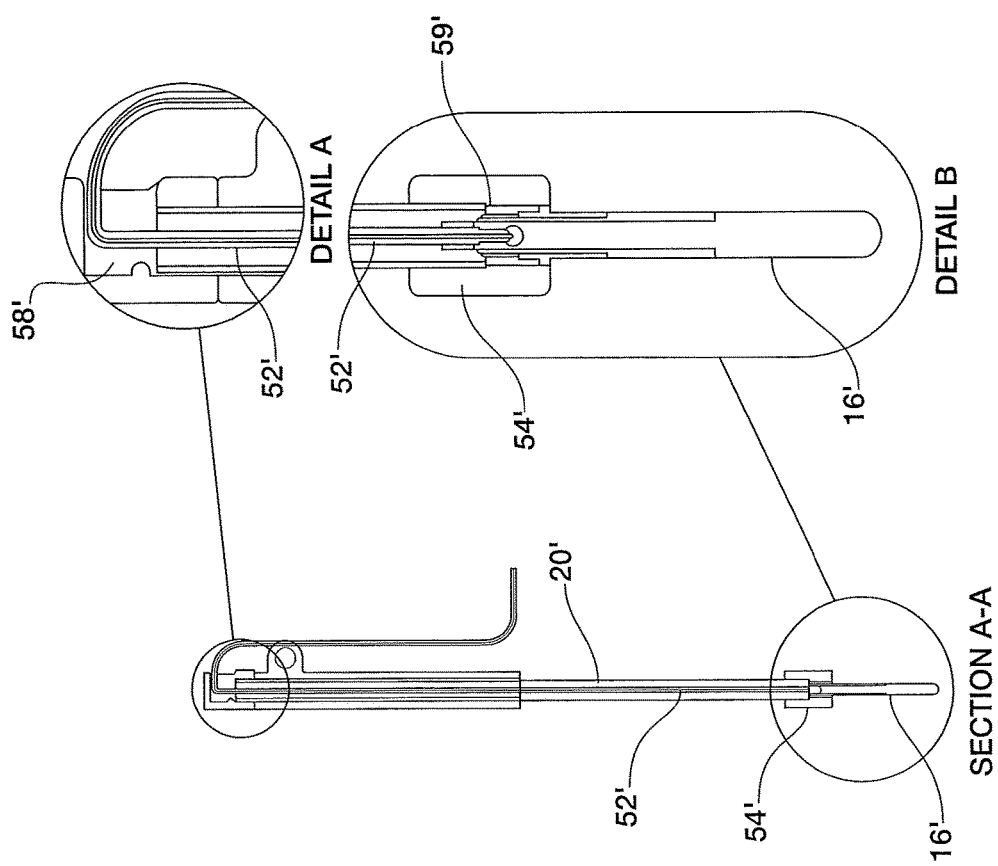
FIG. 13 is a cross-sectional view of the probe shown in FIG. 12.
Figure 12:
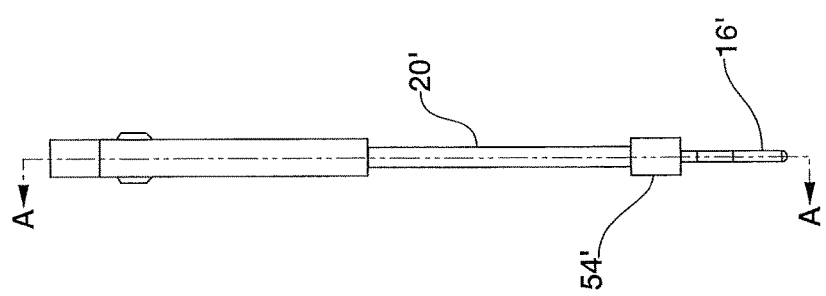
FIG. 12 is a side elevational view of the probe shown in FIG. 11.
Figure 14:
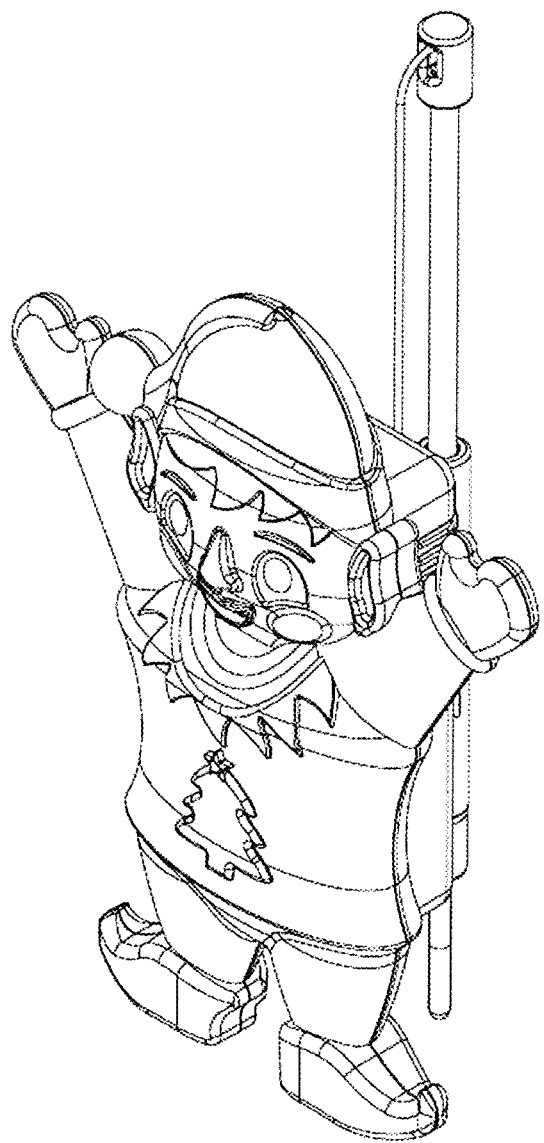
FIG. 14 is an overhead perspective view of another example of a Christmas tree moisture light sensor according to the present disclosure.
Figure 15:
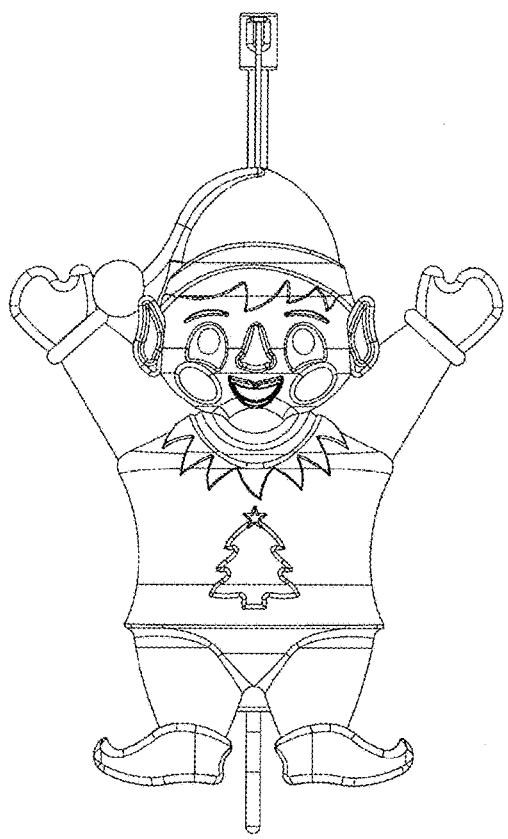
FIG. 15 is a front elevational view of the example shown in FIG. 14.
Figure 16:
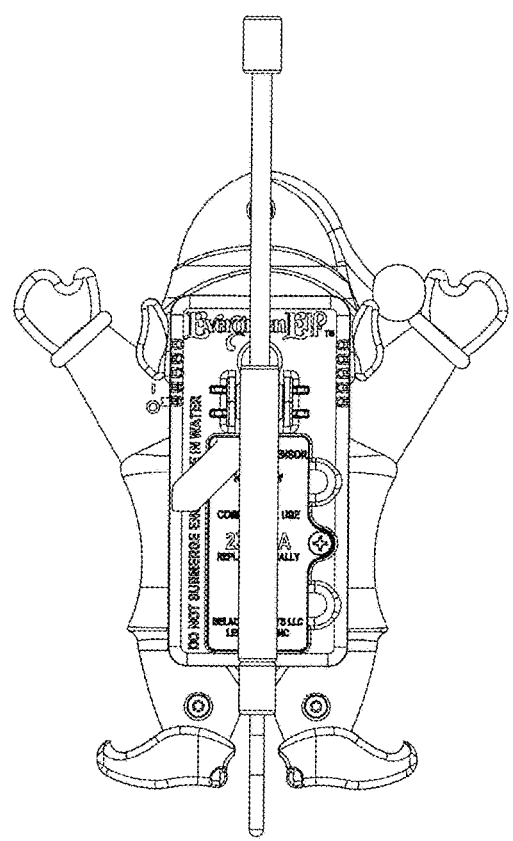
FIG. 16 is a back elevational view of the example shown in FIG. 14.
Figure 17:
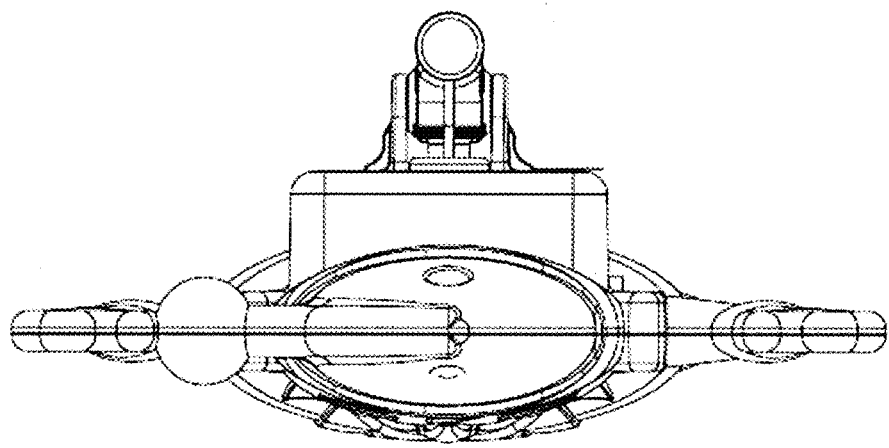
FIG. 17 is a top view of the example shown in FIG. 14.
Figure 18:
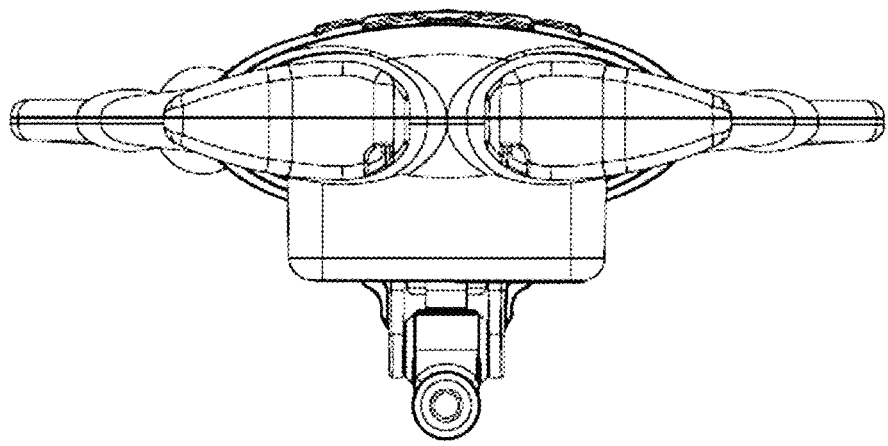
FIG. 18 is a bottom view of the example shown in FIG. 14.
Figure 19:
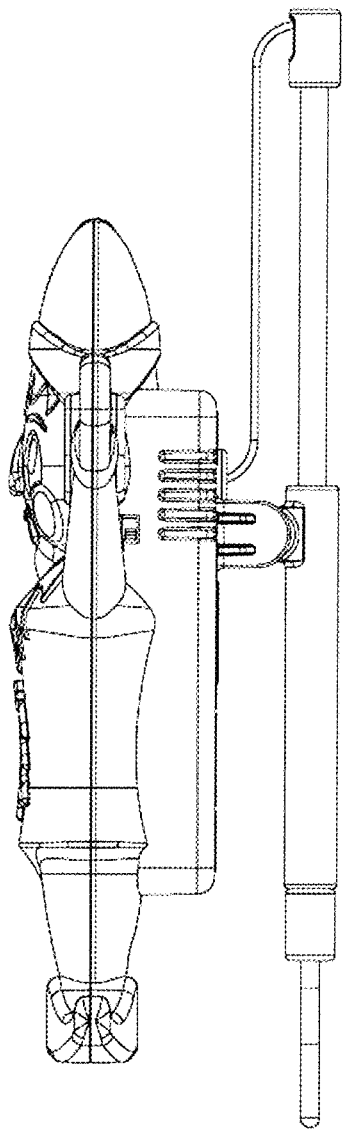
FIG. 19 is a left side elevational view of the example shown in FIG. 14.
Figure 20:
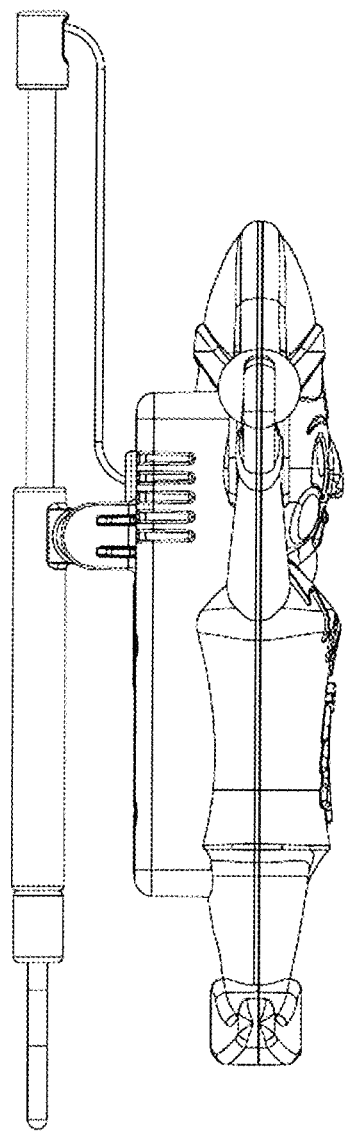
FIG. 20 is a right side elevational view of the example shown in FIG. 14.

FIG. 12 is an enlarged view of probe 16' and rod 20'. FIG. 13 is a cross-sectional view along lines A-A of the probe and rod shown in FIG. 12. A conductive wire 52' for sensing water conductivity runs through probe 16' and rod 20' and connects to the PC board (not shown). Probe 16' and rod 20' are separated by a bottom insulator 54', and rod 20' further includes a silicone insulator 58' that provides a water-tight seal at an opposing end. A shrink-wrap wire sleeve 59' may be further included to prevent contact with probe 16'.

EXAMPLE

Algorithm for Moisture Sensor

The software sequence begins with a startup check every 10 seconds for first 2 minutes. A welcome sequence begins when first powered-on, comprising of an audio track and an LED (green) blinking 5 times during Audio Output 0.100 seconds ON, 0.300 seconds OFF. The software then checks the water and battery condition. If there is a sufficient amount of water, then LED (green) blinks 1 time, 0.100 seconds ON, 0.500 seconds OFF. If there is not sufficient water, then: i) there is an audio output using a second audio track with a 0.500 second delay, and ii) LED (red) blinks 3 times during the audio output for 0.100 seconds ON, 0.500 seconds OFF. If there is low battery (triggered at approximately 2.1 V DC), then: i) there is an audio output using a third audio track with a 0.500 second delay, and ii) LED (amber) blinks 3 times during the audio output for 0.100 seconds ON, 0.500 seconds OFF.

After the first 2 minutes, the software performs a water and battery condition check every 10 seconds. If there is a sufficient amount of water, then the LED (green) blinks one time (0.100 seconds ON). If there is an indication of no water or low battery, then a global timer is started at the first indication of no water or low battery and the following global sequence begins. An audio output using the first audio track is played. If there is no water, then there is a 0.500 second delay followed by the second audio track. The LED (red) blinks 3 times during audio output for 0.100 seconds ON, 0.500 seconds OFF. If there is low battery, then there is a 0.500 second delay before the third track is played. The LED (amber) blinks 3 times during audio output for 0.100 seconds ON, 0.500 seconds OFF. Water checks and battery checks are continued at 10 second intervals, and the audio output for the first audio track is repeated every 60 minutes on the global timer. The intent of this global sequence is to indicate no water and/or low battery (failure modes) every hour starting at the time the first failure mode is logged. If both no water and low battery are sensed, the second sensed failure mode will be indicated at the same time the first failure mode is indicated during the 60 minute audio output interval.

If there continues to be no water after the first indication but before a 60 minute interval on the global timer, then the LED (red) blinks 3 times for 0.100 seconds ON, and 0.500 seconds OFF. If there continues to be a low battery (triggered at approximately 2.1 V DC) after the first indication but before a 60 minute interval on the global timer, then the LED (amber) blinks 3 times for 0.100 seconds ON, and 0.500 seconds OFF.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:
1. A moisture sensor comprising:
   a housing adapted to mount onto a tree stem,
   a probe attached to the housing and adapted to detect water levels in a tree stand, the probe detects the conductivity of water to determine the water level,
   a conductive rod with insulators at each opposing end wherein the probe is
   separated by one insulator at a first end of the conductive rod and the other end of the conductive rod is inserted into the housing,
   a PC board within the housing for determining water levels in the tree stand, a LED indicator adapted to provide a visual signal when water levels are below a threshold in the tree stand, and
   a speaker adapted to provide an audio signal when water levels are below the threshold in the tree stand, wherein the LED indicator signals the visual alert and the speaker signals the audio alert when the probe detects that the water level is below a threshold, wherein the probe detects the conductivity of water to determine the water level, wherein the probe comprises a copper wire connected at one end to the PC board, and an opposing end capped by a conductive shield, and further including a silicone insulator on the other end of the conductive rod adapted to provide a water-tight seal between the conductive rod and the housing.

2. The moisture sensor according to claim 1, wherein the moisture sensor is powered by a battery.

3. The moisture sensor according to claim 2, wherein the LED indicator is adapted to indicate a level of the battery.

4. The moisture sensor according to claim 2, wherein the PC board is configured to check the level of the battery and the water level after an interval.

5. The moisture sensor according to claim 4, wherein the interval is one hour.

6. The moisture sensor according to claim 1 further including a power switch to reduce power consumption.

7. The moisture sensor according to claim 1, wherein the housing includes a strap for wrapping around the tree stem.

8. The moisture sensor according to claim 1 further including a vent in the housing adapted to improve emission of the audio alert.

9. The moisture sensor according to claim 8, wherein the audio alert is a chime.

* * * * *